United States Patent
Raine

(10) Patent No.: US 11,953,040 B2
(45) Date of Patent: Apr. 9, 2024

(54) CLIP FOR CONNECTING A COVER PANEL TO A VEHICLE BODY, AN ARRANGEMENT, AND A VEHICLE

(71) Applicant: Volvo Truck Corporation, Gothenburg (SE)

(72) Inventor: Jacob Raine, Tvååker (SE)

(73) Assignee: Volvo Truck Corporation, Gothenburg (SE)

( * ) Notice: Subject to any disclaimer, the term of this patent is extended or adjusted under 35 U.S.C. 154(b) by 348 days.

(21) Appl. No.: 17/605,356

(22) PCT Filed: May 3, 2019

(86) PCT No.: PCT/EP2019/061411
§ 371 (c)(1),
(2) Date: Oct. 21, 2021

(87) PCT Pub. No.: WO2020/224745
PCT Pub. Date: Nov. 12, 2020

(65) Prior Publication Data
US 2022/0186765 A1   Jun. 16, 2022

(51) Int. Cl.
*F16B 5/06* (2006.01)
*F16B 21/07* (2006.01)

(52) U.S. Cl.
CPC ............ *F16B 21/076* (2013.01); *F16B 5/065* (2013.01); *F16B 5/0657* (2013.01); *F16B 5/06* (2013.01)

(58) Field of Classification Search
CPC .. F16B 5/02; F16B 5/0208; F16B 5/06; F16B 5/065; F16B 5/0657; F16B 21/076;
(Continued)

(56) References Cited

U.S. PATENT DOCUMENTS 2,523,652 A * 9/1950 Dowd ................. A43C 15/161
411/141
3,455,201 A * 7/1969 Ryder .................. F16B 21/086
411/15
(Continued)

FOREIGN PATENT DOCUMENTS

CN   102459930 A   5/2012
CN   106471264 A   3/2017
(Continued)

OTHER PUBLICATIONS

First Office Action for Chinese Patent Application No. 201980095950.8, dated Feb. 20, 2023, 20 pages.
(Continued)

*Primary Examiner* — Roberta S Delisle
(74) *Attorney, Agent, or Firm* — Withrow & Terranova, PLLC

(57) ABSTRACT

The invention relates to a clip for connecting a cover panel to a vehicle body. The clip comprises an annular inner portion defining a central through hole for receiving a fastening means for securing the clip to the vehicle body. The clip also comprises a plurality of leg portions for snap-locking a cover panel to be mounted to the vehicle body. The leg portions extend radially from the annular inner portion and are circumferentially distributed and separated from each other by void spaces. Each leg portion has an initial contact surface. Each leg portion is configured to flex radially inwardly towards the annular inner portion when the initial contact surface is subjected to a pressing force, and to snap radially outwardly when said pressing force on the initial contact surface as ceased. The axial extension of the annular inner portion is shorter than the axial extension of the leg portions.

17 Claims, 3 Drawing Sheets

(58) Field of Classification Search
CPC .......... F16B 21/18; F16B 37/02; F16B 37/04; F16B 39/14
USPC ....... 411/15, 337, 352–353, 366.1, 368, 424, 411/516–517, 523
See application file for complete search history.

(56) References Cited

U.S. PATENT DOCUMENTS

| | | | | |
|---|---|---|---|---|
| 5,957,269 | A * | 9/1999 | Sahashi | ............... H01H 9/04 200/61.81 |
| 8,403,612 | B2 * | 3/2013 | Wright | ................. B60R 22/24 411/367 |
| 8,992,150 | B2 * | 3/2015 | Korn | .................. F16B 41/002 411/352 |
| 2009/0133228 | A1 | 5/2009 | Werner et al. | |
| 2011/0211934 | A1 * | 9/2011 | Walther | ............. F16B 25/0015 411/387.1 |
| 2014/0241830 | A1 * | 8/2014 | Korn | ............... F02M 35/10354 411/392 |
| 2016/0114735 | A1 * | 4/2016 | Kwon | .................... F16B 5/065 296/43 |
| 2016/0319856 | A1 * | 11/2016 | Metten | ................. F16B 21/076 |
| 2021/0190105 | A1 * | 6/2021 | Muecke | ................... F16B 5/02 |

FOREIGN PATENT DOCUMENTS

| | | |
|---|---|---|
| CN | 107269652 A | 10/2017 |
| DE | 94071756 U1 | 7/1994 |
| WO | 2007025687 A1 | 3/2007 |

OTHER PUBLICATIONS

International Search Report and Written Opinion for International Patent Application No. PCT/EP2019/061411, dated Feb. 5, 2020, 14 pages.

* cited by examiner

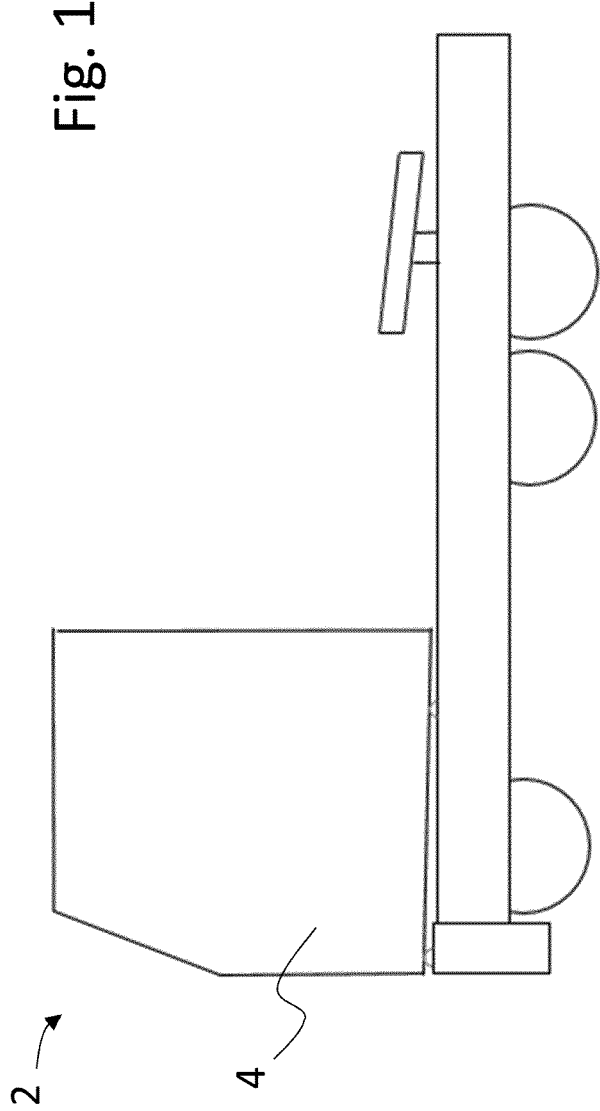

CLIP FOR CONNECTING A COVER PANEL TO A VEHICLE BODY, AN ARRANGEMENT, AND A VEHICLE

This application is a 35 USC 371 national phase filing of International Application No. PCT/EP2019/061411, filed May 3, 2019, the disclosure of which is incorporated herein by reference in its entirety.

TECHNICAL FIELD

The invention relates to a clip for connecting a cover panel to a vehicle body. The invention also relates to an arrangement comprising such a clip in combination with a fastening means. Furthermore, the invention relates to a vehicle comprising such a clip or such an arrangement.

The invention can be applied in heavy-duty vehicles, such as trucks, buses and construction equipment. Although the invention will be described with respect to a truck, the invention is not restricted to this particular vehicle, but may also be used in other vehicles such as passenger cars.

BACKGROUND

There is an increasing demand to have hidden fixations in order to provide a smooth visual appearance of decorative cover panels that are mounted to the vehicle. Often space is limited between the cover panel and the part of the vehicle to which the cover panel is to be mounted.

US 2009/0133228 A1 discloses a fastener with a shank and, arranged at one end of the shank, a head intended for welding to a workpiece. The fastener has multiple detent pawls formed on the shank that extend radially outward from the shank towards the head and that are elastically resilient in the radially inward direction. A trim panel may be pressed onto the fastener and become snapped into a pawl.

The fastener in US 2009/0133228 A1 is rather bulky and does not disclose that the fastener may be hidden between the trim panel and the workpiece to which it is connected.

SUMMARY

An object of the invention is to provide a clip for connecting a cover panel to a vehicle body, which alleviates the drawbacks of the prior art.

According to a first aspect of the invention, the object is achieved by a clip for connecting a cover panel to a vehicle body. The clip comprises:

an annular inner portion having a first side adapted to face a vehicle body and an opposite second side adapted to face away from the vehicle body, the annular inner portion defining a central through hole which extends axially from said second side to said first side for receiving a fastening means for securing the clip to the vehicle body, wherein a first axial direction is directed from the first side to the second side and wherein a second axial direction is directed oppositely to the first axial direction, and a plurality of leg portions for snap-locking a cover panel to be mounted to the vehicle body, the leg portions extending radially from the annular inner portion and being circumferentially distributed and separated from each other by void spaces, each leg portion having an initial contact surface, wherein the leg portion is configured to flex radially inwardly towards the annular inner portion when the initial contact surface is subjected to a pressing force in a direction parallel to said second axial direction, and to snap radially outwardly when said pressing force on the initial contact surface has ceased, wherein the axial extension of the annular inner portion is shorter than the axial extension of the leg portions.

By the provision of a clip comprising an inner portion having an axial extension which is shorter than the axial extension of each leg portion, a compact clip is accomplished. Furthermore, the small axial extension is beneficial for the clip to receive a fastening means such as a screw, bolt or rivet, the head of which may, for instance, be accommodated in a space defined by the axially extending leg portions around the annular inner portion.

It should be understood that in this disclosure, the term annular is to be understood as forming a closed path, such as a ring-shape. However, it must be understood that the annular inner portion does not necessarily form a circular shape, but that other closed paths are conceivable. Just like a ring, does not need to be circular but have various shapes, including oval, or even square shaped (like a boxing ring), the annular inner portion may also be embodied as various ring-like shapes.

Even though the annular inner portion is not necessarily a circular configuration, the various directions of extensions of the clip may be described based on a cylindrical r, $\theta$, z—coordinate system, wherein the coordinate r defines the radial direction, the coordinate $\theta$ defines the circumferential/angular direction and the coordinate z defines the axial direction. Thus, according to the invention, the axial extension, i.e. in the z-direction, is longer for the leg portions than for the annular inner portion. The leg portions are distributed around the annular inner portion in the circumferential direction, i.e. the $\theta$-direction, and they extend from the annular portion radially, i.e. in the r-direction.

According to at least one exemplary embodiment, each leg portion comprises an engagement surface, wherein the leg portion is configured to flex radially inwardly when the initial contact surface is pressed by a cover panel to be mounted, and wherein the engagement surface is configured to snap onto a mating engagement surface of the cover panel when the cover panel has been pressed past the initial contact surface. By having an initial contact surface separate from than engagement surface, an efficient snap-lock effect is obtainable.

According to at least one exemplary embodiment, each leg portion comprises an undercut extending radially inwardly from the initial contact surface, wherein the undercut comprises said engagement surface, which is adapted to face the vehicle body. An undercut provides an advantageous surface for holding a mating structure such as an engagement surface of a cover panel, and reduces the risk of the cover panel loosening from the clip.

According to at least one exemplary embodiment, the undercut extends for 1-2 mm, such as 1.3-1.7 mm from the initial contact surface. According to at least one exemplary embodiment, said engagement surface forms an angle of 0°-45°, such as 15°-35°, typically 20°-30°, relative to a geometrical plane which is perpendicular to said first and second axial directions. These ranges have been found to allow for a beneficial engagement with a cover panel. The exemplified extension of the undercut may be enough for providing a robust snapping function that is audible as an indication that the clip has snapped into place during mounting of a cover panel. The exemplified angle also allows for the use of a reasonable disassembly force to be used, in case the cover panel is later to be removed and replaced.

According to at least one exemplary embodiment, each leg portion has a generally arched shape formed by a radially inner leg-subportion, a radially outer leg-subportion and an intermediate knee, wherein the inner leg-subportion extends from the inner portion to the knee, and the outer leg-subportion extends from the knee to its free end. This is a beneficial configuration of the leg portions, because it combines resiliency of the leg portions with a limited axial extension.

According to at least one exemplary embodiment, the outer leg-subportion has both an axial extension and a radial extension. The partially radial extension of the outer leg-subportion is beneficial because when a cover panel is pressed in the axial direction of the clip, the outer leg-subportions will due to the continuous forward motion of the pressing cover panel be gradually pressed radially inwardly, and then flexed back with relatively strong force, thereby providing for a clearly discernible snap-lock.

According to at least one exemplary embodiment, the inner leg-subportion has both an axial extension and a radial extension. By having also a radial extension of the inner leg-subportion, the resiliency of the outer leg-subportion may be easier to configure as desired.

According to at least one exemplary embodiment, the inner leg-subportion extends from the second side of the annular inner portion in a direction away from said first and second sides of the annular inner portion. This is advantageous since the inner leg sub-portions may define a boundary within which, for instance, a head and/or shoulder of a fastening means (such as a screw, bolt or rivet) may be confined, for fastening the clip to a vehicle body.

According to at least one exemplary embodiment, the initial contact surface and the engagement surface are both provided on the outer leg-subportion. This is advantageous since the outer leg-subportion is the one that is most convenient to provide with a resilient and efficient snap-lock function.

According to at least one exemplary embodiment, said outer leg-subportion tapers from its free end towards the intermediate knee. This is advantageous as the tapering shape may provide a large initial contact surface for pressing the outer leg-subportion radially inwards.

According to at least one exemplary embodiment, the intermediate knee has a crest which is separated by a distance of 5-9 mm, such as 6-8 mm, for instance 6.7-7.7 mm, from a geometrical plane coinciding with said first side of the annular inner portion. This is advantageous since it provides a relatively low height of the clip, i.e. low axial extension.

According to at least one exemplary embodiment, the axial extension of each leg portion is more than twice, suitably more than three times, the axial extension of the annular inner portion. By keeping the axial extension of the annular inner portion small, a head of a fastener may be accommodated on top of the annular inner portion without adding extra height to the clip as a whole.

According to a second aspect of the invention, the object is achieved by an arrangement comprising a clip of the first aspect in combination with a fastening means, such as a screw, bolt or rivet, wherein the fastening means comprises:
 a head portion for pressing the annular inner portion of the clip towards a vehicle body,
 a shank portion for connecting/engaging with the vehicle body, and
 a shoulder portion extending from the head portion to the shank portion and adapted to abut the vehicle body, wherein the shoulder portion is dimensioned to extend through the through hole defined by the annular inner portion such that an annular gap is formed between the shoulder portion and the annular inner portion of the clip.

By providing an arrangement in which a gap is formed between the annular inner portion and a shoulder portion of the fastening means, tolerance stackup is taken care for. The gap is also beneficial for anticipating any temperature-related material expansions/deformations of the cover panel to be mounted. For instance, a large cover panel, may when the temperature changes undergo certain dimensional changes which will affect the clip, which is allowed to "float" because of the gap.

Advantageously, according to at least one exemplary embodiment, the annular gap separates the shoulder portion from the annular inner portion by a distance of 2-3 mm, such as 2.3-2.8 mm, for instance 2.5-2.7 mm.

According to at least one exemplary embodiment, the axial extension of the annular inner portion is shorter than the axial extension of the shoulder portion. This is advantageous, because it allows certain movement of the clip when mounting the cover panel, facilitating the flexing and snapping of the leg portions of the clip.

Advantageously, according to at least one exemplary embodiment, the shoulder portion has an axial extension which is 0.1-0.4 mm greater than the axial extension of the annular inner portion.

According to a third aspect of the invention, the object is achieved by a vehicle comprising a clip according of the first aspect or a an arrangement according of the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 is a schematic illustration of a vehicle, in accordance with at least one exemplary embodiment of the invention.

DETAILED DESCRIPTION OF EXAMPLE EMBODIMENTS OF THE INVENTION

FIG. 1 is a schematic illustration of a vehicle 2, in accordance with at least one exemplary embodiment of the invention. Although the vehicle 2 is illustrated in the form of a truck, other types of vehicles, such as busses, construction equipment, trailers or passenger cars may be provided in accordance with the invention.

The truck (vehicle) comprises a cab 4 in which a driver may operate the vehicle 2. The cab 4 may be provided with cover panels at various locations. Such cover panels may be attached to the body of the cab 4 by means of the inventive clip and/or the inventive arrangement defined in the claims. It should be understood that the inventive clip and/or the inventive arrangement defined in the claims may also be used to attach cover panels/outer panels to other parts of the vehicle 2, for example for aerodynamic reasons, or for concealing and/or protecting certain components. Exemplary embodiments of such an inventive clip and such an inventive arrangement will be discussed in the following with reference to FIGS. 2a-2c, 3 and 4.

Figure 2A:
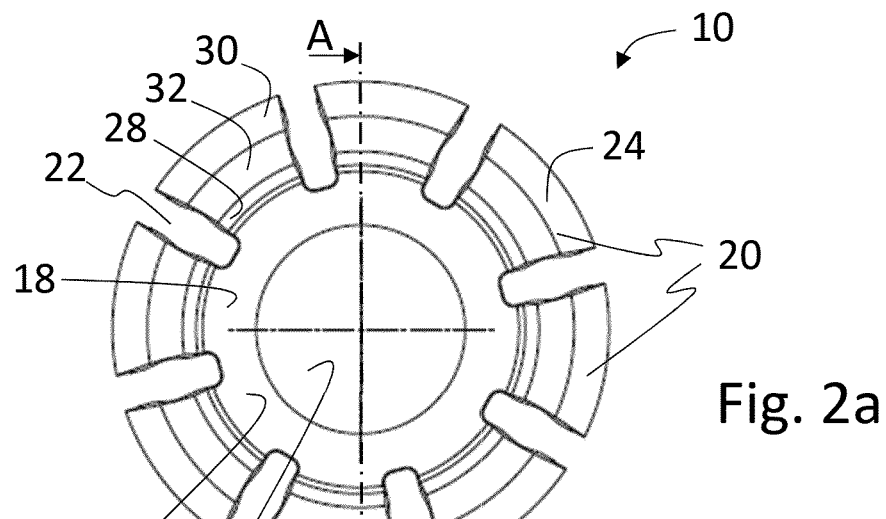
FIGS. 2a-2c illustrate is a clip in accordance with at least one exemplary embodiment of the invention.
Figure 2B:
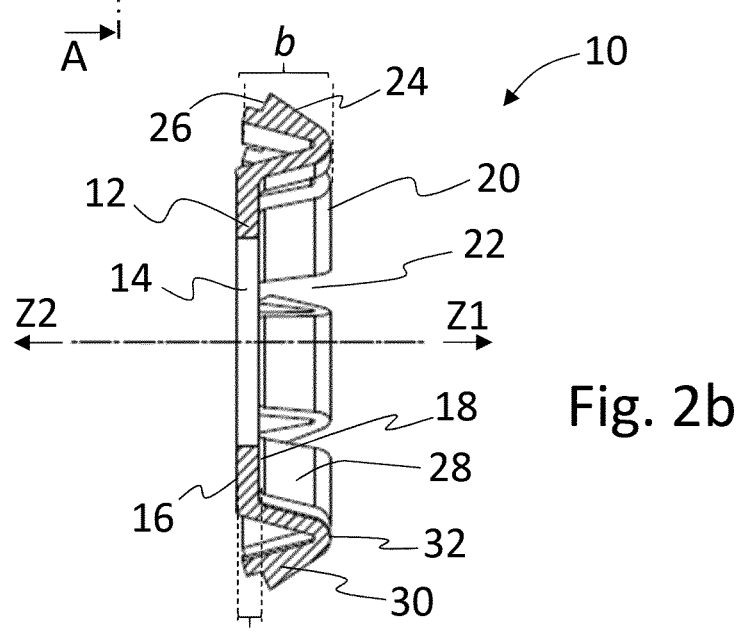
Figure 2C:
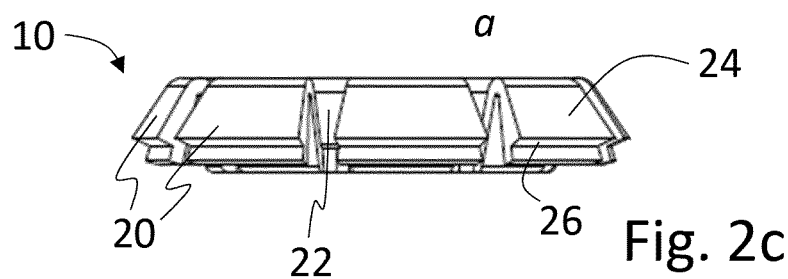

FIGS. 2a-2c illustrate is a clip 10 in accordance with at least one exemplary embodiment of the invention.

FIG. 2a is a top view of the clip 10.

FIG. 2b is a cross-sectional view of the clip 10, taken along line A-A in FIG. 2a.

FIG. 2c is a side view of the clip 10.

As can be seen in FIGS. 2a-2c, the clip 10 comprises an annular inner portion 12. The annular inner portion 12 defines a central through hole 14. Although the annular inner portion 12 and the central through hole 14 are illustrated as being circular, in other exemplary embodiments they may have different shapes, such as polygonal.

The annular inner portion 12 has a first side 16 adapted to face a vehicle body and an opposite second side 18 adapted to face away from the vehicle body. Although it is advantageous, to have the first side 16 and the second side 18 substantially flat, in other exemplary embodiments depending on the type of fastening means to be used with the clip 10, or depending on the contour of the vehicle body, one or both of the first side 16 and second side 18 may have a non-flat shape, for instance a curved or a stepped shape.

The central through hole 14 extends axially from the second side 18 to the first side 16. The central through hole 14 is intended to receive a fastening means (such as the shaft of a screw, bolt or rivet) for securing the clip 10 to the vehicle body.

A first axial direction Z1 may be defined as extending first through the first side 16 and then onwards through the second side 18. A second axial direction Z2 may be defined as being directed oppositely to the first axial direction Z1.

The clip 10 also comprises a plurality of leg portions 20 for snap-locking a cover panel to be mounted to the vehicle body. The leg portions 20 extend radially from the annular inner portion 12 and are circumferentially distributed and separated from each other by void spaces 22. The size of the void spaces 22 between the leg portions 20 and the number of void spaces 22 may be chosen depending on, for instance, how large snap-lock force that is desired. In the exemplary embodiment shown, the number of void spaces 22 is eight and the separating distance between two adjacent leg portions 20, caused by the void spaces 22, may be around 2-3 mm. However, it should be understood that other number of void spaces and leg portions may be provided in other exemplary embodiments. For instance, the number x of leg portions and void spaces may be three, four, five, six, seven, nine, ten, eleven or twelve. The leg portions 20 are suitably symmetrically and/or equidistantly distributed in the circumferential direction as illustrated in the drawings, however, in other exemplary embodiments, one or more of the leg portions may be asymmetrically distributed. The overall diameter of the clip 10 (for example from an outer periphery of the clip defined by one leg portion 20 to an outer periphery of an opposite leg portion 20) may, for instance, be in the range of 30-50 mm, such as 35-45 mm.

Each leg portion 20 has an initial contact surface 24 and each leg portion 20 is configured to flex radially inwardly towards the annular inner portion 12 when the initial contact surface 24 is subjected to a pressing force in a direction parallel to said second axial direction Z2, and to snap radially outwardly when said pressing force on the initial contact surface 24 has ceased. The initial contact surface 24 is herein illustrated as an obliquely extending surface, however, other forms and angles are conceivable in other exemplary embodiments, as long as a pressing force may be applied onto the initial contact surface such that the flexing and snapping-back effect is achieved.

According to the invention, the axial extension a of the annular inner portion 12 is shorter than the axial extension b of the leg portions 20. The axial extension b of each leg portion may for instance be more than twice, suitably more than three times, the axial extension a of the annular inner portion 12. This provides for a compact clip 10. Furthermore, a head of a fastening means may be housed in the volume defined by the leg portions 20 which extend circumferentially around the annular inner portion 12. Put differently, a fastening means may be provided which does not protrude axially (in the first axial direction Z1) beyond the leg portions 20, and thereby will not build in height. As will be discussed later on, this allows for a cover panel to conceal both the clip 10 and the fastening means, and these will therefore not become visible when the cover panel has been connected to a vehicle body, thereby enabling the presentation of an attractive visual appearance, without any fastening or connecting means showing.

The term "axial extension" may, at least in some exemplary embodiments (in particular for embodiments having an annular inner portion 12 with a flat first side 16) be regarded as an extension in a direction which is perpendicular to a geometrical plane coinciding with the plane of the first side 16 of annular inner portion 12.

Each leg portion 20 comprises an engagement surface 26. After the leg portion 20 has flexed radially inwardly due to the initial contact surface 24 having been pressed by a cover panel to be mounted, the engagement surface 26 is configured to snap onto a mating engagement surface of the cover panel when the cover panel has been pressed past the initial contact surface 24. The engagement surface may suitably form an angle relative to the a geometrical plane which is perpendicular to the first and second axial directions Z1 and Z2. That angle may suitably be between 0°-45°, such as 15°-35°, typically 20°-30°.

Although the engagement surface 26 may be at an axially end part (for instance, towards the first axial direction Z1) in other embodiments such as the one illustrated in the drawings, the engagement surface 26 is formed between the ends (as seen in the axial direction) of the leg portions 20. As illustrated in FIG. 2b, the engagement surface 26 may be formed by an undercut extending radially inwardly from the initial contact surface 26.

The undercut may, for instance, extend for 1-2 mm, such as 1.3-1.7 mm from the initial contact surface 24.

Each leg portion 20 has a generally arched shape formed by a radially inner leg-subportion 28, a radially outer leg-subportion 30 and an intermediate knee 32. The inner leg-subportion 28 extends from the annular inner portion 12 to the knee 32, and the outer leg-subportion 30 extends from the knee 32 to its free end. The inner leg-subportion 28 may suitably extend from the second side 18 of the annular inner portion 12 in a direction away from said first and second sides 16, 18 of the annular inner portion 12.

As illustrated in FIG. 2b, in at least some exemplary embodiments, the thickness of the outer leg-subportion 30 is greater than the thickness of the inner leg-subportion 28. However, in other exemplary embodiments the thickness of the inner leg-subportion 28 may be equal to or greater than the thickness of the outer leg-subportion 30. Furthermore, as illustrated in FIG. 2b, in at least some exemplary embodiments, the length of the outer leg-subportion 30 may be longer than the length of the inner leg-subportion 28, while in other exemplary embodiments, the length of the inner leg-subportion 28 is equal to or longer than the length of the outer leg-subportion 30. As illustrated in FIG. 2, in at least some exemplary embodiments the outer leg-subportion 30 extends from the knee 32 axially beyond the second side 18 of the annular inner portion 12. In at least some exemplary embodiments the outer leg-subportion 30 extends from the knee 32 axially beyond the second side 18 but not axially beyond the first side 16 of the annular inner portion 12. In some exemplary embodiments, however, the outer leg-subportion 30 extends from the knee but not beyond the second side 18 of the annular inner portion 12.

As best seen in FIG. 2b, in at least some exemplary embodiments the outer leg-subportion has both an axial extension and a radial extension. Similarly, the inner leg-subportion 28 may have both an axial extension and a radial extension. As can be seen in FIG. 2b, the initial contact surface 24 may suitably form a greater angle relative to the axial directions Z1, Z2 than the inner leg-subportion 28, although in other exemplary embodiments it may form the same or a smaller angle. The large angle is advantageous in that it provides a large surface area to be pressed by the cover panel when becoming mounted to the vehicle body. Thus, in at least some exemplary embodiments, the outer leg-subportion 30 tapers from its free end towards the intermediate knee 32.

In at least some exemplary embodiment, as illustrated in FIGS. 2b and 2c, the initial contact surface 24 and the engagement surface 26 are both provided on the outer leg-subportion 30. In other exemplary embodiments, the initial contact surface may, for instance be provided on the knee.

According to at least some exemplary embodiments, the intermediate knee 32 of each leg portion 20 has a crest which is separated by a distance of 5-9 mm, such as 6-8 mm, for instance 6.7-7.7 mm, from a geometrical plane coinciding with said first side 16 of the annular inner portion.

Figure 3:
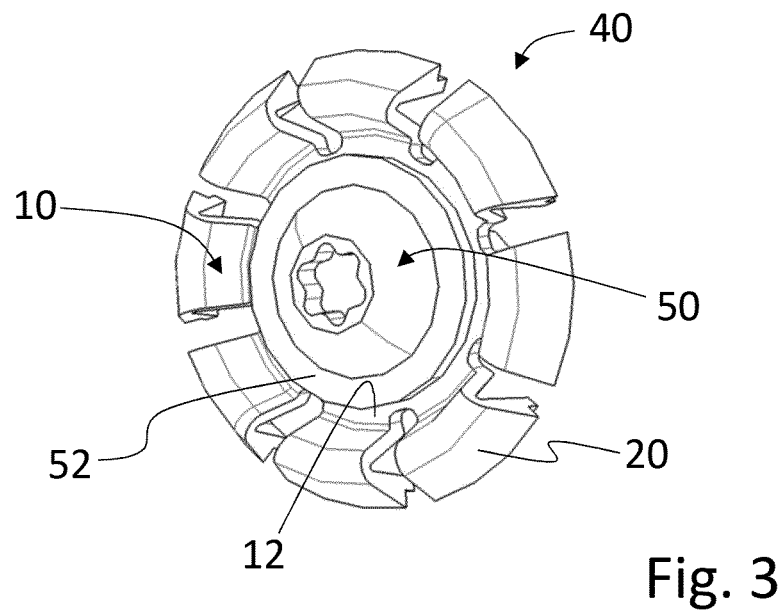
FIG. 3 illustrates an arrangement comprising a clip in combination with a fastening means, in accordance with at least one exemplary embodiment of the invention.
Figure 4:
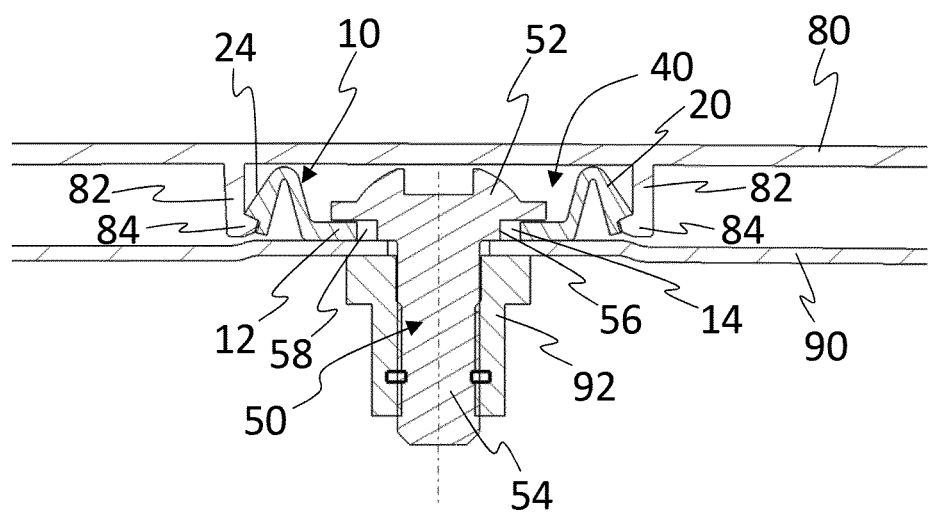
FIG. 4 illustrates a cover panel having been connected to a vehicle body by means of an arrangement according to at least one exemplary embodiment of the invention.

Turning now to FIGS. 3 and 4, wherein FIG. 3 illustrates an arrangement 40 comprising a clip 10 (such as the clip in FIGS. 2a-2c) in combination with a fastening means 50, in accordance with at least one exemplary embodiment of the invention, and FIG. 4 illustrates a cover panel 80 having been connected to a vehicle body 90 by means of an arrangement 40 (such as the arrangement in FIG. 3) according to at least one exemplary embodiment of the invention.

The fastening means 50 is herein illustrated as a bolt, however it could be some other type of fastening means, such as a screw or rivet. The fastening means 50 comprises head portion 52 and a shank portion 54. The fastening means 50 also comprises a shoulder portion 56 extending from the head portion 52 to the shank portion 54. The head portion 52 is configured to press the annular inner portion 12 of the clip 10 towards the vehicle body 90. The shank portion 54 extends through the vehicle body 90 and is configured to connect/engage with the vehicle body 90 directly or indirectly via a connecting element 92 such as a threaded nut or sleeve. The shoulder portion 56 is adapted to abut the vehicle body 90 and is dimensioned to extend through the through hole 14 defined by the annular inner portion 12 such that an annular gap 58 is formed between the shoulder portion 56 and the annular inner portion 12 of the clip 10. The annular gap 58 may suitably separate the shoulder portion 56 from the annular inner portion 12 by a distance of 2-3 mm, such as 2.3-2.8 mm, for instance 2.5-2.7 mm.

According to at least some exemplary embodiments, the axial extension of the annular inner portion 12 is shorter than the axial extension of the shoulder portion 56. The shoulder portion 56 may, for instance, have an axial extension which is 0.1-0.4 mm greater than the axial extension of the annular inner portion 12.

In use, the arrangement 40 may, after it has been fixated to the vehicle body 90, receive the cover panel 80 so that the cover panel 80 becomes connected to the vehicle body 90 as illustrated in FIG. 4. The cover panel 80 is herein illustrated as having at least two arms 82 intended to extend from the main part of the cover panel 80 in the second axial direction Z2 (cf. FIG. 2b). Each arm 82 of the cover panel 80 is configured to engage with a respective leg portion 20 of the clip 10. More specifically, each arm has a projection 84. As the cover panel 80 approaches the arrangement 40, a leading side of the projection 84 of the arm comes into contact with and presses the initial contact surface 24, thereby causing the leg portion 20, in particular the outer leg-subportion to flex radially inwardly. Next, when the projection 84 has moved axially past the initial contact surface 24, the leg portion 20 will flex back and snap onto the projection 84. More particularly, the engagement surface 26 (see FIGS. 2b-2c) of the leg portion 20 will come into engagement with a trailing side of the projection 84. In other words the trailing side of the projection 84 presents a mating engagement surface. In this state, as illustrated in FIG. 4, the cover panel 80 is appropriately connected to the vehicle body 90, and conceals the arrangement including the clip 10 and the fastening means 50.

It is to be understood that the present invention is not limited to the embodiments described above and illustrated in the drawings; rather, the skilled person will recognize that many changes and modifications may be made within the scope of the appended claims.

The invention claimed is:

1. An arrangement comprising:
   a clip; and
   a fastener comprising:
      a head portion for pressing an annular inner portion of the clip towards a vehicle body,
      a shank portion for connecting with the vehicle body, and
      a shoulder portion extending from the head portion to the shank portion and adapted to abut the vehicle body, the shoulder portion is dimensioned to extend through a through hole defined by the annular inner portion such that an annular gap is formed between the shoulder portion and the annular inner portion of the clip.

2. The arrangement of claim 1, wherein the clip comprises:
   the annular inner portion having a first side adapted to face the vehicle body and an opposite second side adapted to face away from the vehicle body, the annular inner portion defining the through hole which extends axially from the second side to the first side for receiving the fastener for securing the clip to the vehicle body, a first axial direction is directed from the first side to the second side and a second axial direction is directed opposite to the first axial direction, and
   a plurality of leg portions for snap-locking the cover panel to be mounted to the vehicle body, the leg portions extending radially from the annular inner portion and being circumferentially distributed and separated from each other by void spaces, each leg portion having an initial contact surface, wherein the leg portion is configured to flex radially inwardly towards the annular inner portion when the initial contact surface is subjected to a pressing force in a direction parallel to the second axial direction, and to snap radially outwardly when the pressing force on the initial contact surface has ceased, wherein an axial extension of the annular inner portion is shorter than an axial extension of the leg portions.

3. The arrangement of claim 2, wherein each leg portion comprises an engagement surface, wherein the leg portion is configured to flex radially inwardly when the initial contact surface is pressed by the cover panel to be mounted, and wherein the engagement surface is configured to snap onto a mating engagement surface of the cover panel when the cover panel has been pressed past the initial contact surface.

4. The arrangement of claim 3, wherein each leg portion comprises an undercut extending radially inwardly from the initial contact surface, wherein the undercut comprises the engagement surface, which is adapted to face the vehicle body.

5. The arrangement of claim 4, wherein the undercut extends for 1-2 mm.

6. The arrangement of claim 3, wherein the engagement surface forms an angle of 0°-45° relative to a geometrical plane which is perpendicular to the first and second axial directions.

7. The arrangement of claim 2, wherein each leg portion has a generally arched shape formed by a radially inner leg-subportion, a radially outer leg-subportion and an intermediate knee, wherein the inner leg-subportion extends from the annular inner portion to the knee, and the outer leg-subportion extends from the knee to its free end.

8. The arrangement of claim 7, wherein the outer leg-subportion has both an axial extension and a radial extension.

9. The arrangement of claim 7, wherein the inner leg-subportion has both an axial extension and a radial extension.

10. The arrangement of claim 7, wherein the inner leg-subportion extends from the second side of the annular inner portion in a direction away from the first and second sides of the annular inner portion.

11. The arrangement of claim 7, wherein each leg portion comprises an engagement surface, wherein the leg portion is configured to flex radially inwardly when the initial contact surface is pressed by the cover panel to be mounted, and wherein the engagement surface is configured to snap onto a mating engagement surface of the cover panel when the cover panel has been pressed past the initial contact surface;

wherein the initial contact surface and the engagement surface are both provided on the outer leg-subportion.

12. The arrangement of claim 7, wherein the outer leg-subportion tapers from its free end towards the intermediate knee.

13. The arrangement of claim 7, wherein the intermediate knee has a crest which is separated by a distance of 5-9 mm from a geometrical plane coinciding with the first side of the annular inner portion.

14. The arrangement of claim 2, wherein the axial extension of each leg portion is more than twice the axial extension of the annular inner portion.

15. The arrangement of claim 1, wherein the annular gap separates the shoulder portion from the annular inner portion by a distance of 2-3 mm.

16. The arrangement of claim 1, wherein an axial extension of the annular inner portion is shorter than an axial extension of the shoulder portion.

17. The arrangement of claim 16, wherein the shoulder portion has an axial extension which is 0.1-0.4 mm greater than the axial extension of the annular inner portion.

\* \* \* \* \*